(12) United States Patent
Hickam

(10) Patent No.: US 7,344,472 B2
(45) Date of Patent: Mar. 18, 2008

(54) POWER SYSTEM

(75) Inventor: Christopher Dale Hickam, Glasford, IL (US)

(73) Assignee: Caterpillar Inc., Peoria, IL (US)

( * ) Notice: Subject to any disclaimer, the term of this patent is extended or adjusted under 35 U.S.C. 154(b) by 178 days.

(21) Appl. No.: 11/261,637

(22) Filed: Oct. 31, 2005

(65) Prior Publication Data

US 2007/0099750 A1    May 3, 2007

(51) Int. Cl.
*B60W 10/02* (2006.01)

(52) U.S. Cl. ........................................................ 477/5

(58) Field of Classification Search ............... 475/2, 475/5; 477/5
See application file for complete search history.

(56) References Cited

U.S. PATENT DOCUMENTS

| | | | |
|---|---|---|---|
| 5,251,512 A | 10/1993 | Koenig et al. |
| 5,415,603 A | 5/1995 | Tuzuki et al. |
| 5,562,565 A | 10/1996 | Moroto et al. |
| 5,620,393 A | 4/1997 | Minowa et al. |
| 5,934,396 A | 8/1999 | Kurita |
| 6,428,444 B1 | 8/2002 | Tabata |
| 6,554,088 B2 | 4/2003 | Severinsky et al. |
| 6,612,386 B2 | 9/2003 | Tamai et al. |
| 6,617,703 B2 | 9/2003 | Matsubara et al. |
| 6,625,534 B2 | 9/2003 | Suzuki et al. |
| 6,668,224 B2 | 12/2003 | Kawai et al. |
| 6,726,593 B2 | 4/2004 | Yamamoto et al. |
| 6,740,006 B2 | 5/2004 | Tabata |
| 6,773,372 B2 | 8/2004 | Matsubara et al. |
| 6,777,837 B2 | 8/2004 | Tsuzuki et al. |
| 6,805,211 B2 | 10/2004 | Fujikawa |
| 6,808,470 B2 | 10/2004 | Boll |
| 6,809,429 B1 | 10/2004 | Frank |
| 6,840,341 B2 | 1/2005 | Fujikawa |
| 6,846,265 B2 | 1/2005 | Yamamoto et al. |
| 6,890,283 B2 | 5/2005 | Aoki |
| 6,892,128 B2 | 5/2005 | Asakawa et al. |
| 6,906,442 B2 | 6/2005 | Yamaguchi |
| 6,913,558 B2 | 7/2005 | Mori et al. |
| 6,935,450 B1 | 8/2005 | Tsuzuki et al. |
| 2001/0020789 A1 | 9/2001 | Nakashima |

FOREIGN PATENT DOCUMENTS

| | | |
|---|---|---|
| EP | 1177928 | 2/2002 |
| EP | 1177931 | 2/2002 |

*Primary Examiner*—Dirk Wright
(74) *Attorney, Agent, or Firm*—Finnegan, Henderson, Farabow, Garrett & Dunner

(57) ABSTRACT

A power system includes a prime mover, a transmission, and a fluid coupler having a selectively engageable lockup clutch. The fluid coupler may be drivingly connected between the prime mover and the transmission. Additionally, the power system may include a motor/generator drivingly connected to at least one of the prime mover and the transmission. The power-system may also include power-system controls configured to execute a control method. The control method may include selecting one of a plurality of modes of operation of the power system. Additionally, the control method may include controlling the operating state of the lockup clutch dependent upon the mode of operation selected. The control method may also include controlling the operating state of the motor/generator dependent upon the mode of operation selected.

33 Claims, 3 Drawing Sheets

| Key | | | |
|---|---|---|---|
| Prime Mover Operating State | 0 = Inactive | 1 = Operating | |
| Motor/Generator Operating State | 0 = Inactive | 1 = Motoring Forward | 2 = Motoring Reverse | 3 = Generating |
| Transmission Operating State | 0 = Non-Power-Transmitting | 1 = Power-Transmitting | |
| Selectively Engageable Lockup Clutch Operating State | 0 = Disengaged | 1 = Engaged | |

| Power System Mode of Operation | Prime Mover Operating State | Motor/Generator Operating State | Transmission Operating State | Selectively Engageable Lockup Clutch Operating State |
|---|---|---|---|---|
| Electric Propulsion Modes of Operation | | | | |
| PEPF | 0 | 1 | 1 | 0 |
| PEPR | 0 | 2 | 1 | 0 |
| HEP1 | 1 | 1 | 1 | 0 |
| HEP2 | 1 | 1 | 1 | 1 |
| Electricity-Generating Modes of Operation | | | | |
| G1 | 1 | 3 | 0 | 0 |
| G2 | 1 | 3 | 1 | 0 |
| G3 | 1 | 3 | 0 | 1 |
| G4 | 1 | 3 | 1 | 1 |
| G5 (Mobile Machine in Motion) | 0 | 3 | 1 | 0 |
| Prime-Mover-Starting Modes of Operation | | | | |
| STARTPM1 | 0 | 1 | 0 | 1 |
| STARTPM2 | 0 | 1 | 1 | 1 |
| STARTPM3 (Mobile Machine in Motion) | 0 | 0 | 1 | 1 |
| STARTPM4 (Mobile Machine in Motion) | 0 | 3 | 1 | 1 |
| Electric Power-Takeoff Modes of Operation (Power-Takeoff Device Drivingly Connected to Rotary Input Member of Transmission) | | | | |
| PTO1 | 0 | 1 | 0 | 0 |
| PTO2 | 1 | 1 | 0 | 0 |
| PTO3 | 1 | 1 | 0 | 1 |
| Retarder Modes of Operation (Mobile Machine in Motion) | | | | |
| R1 | 1 | 2 | 1 | 0 |
| R2 | 1 | 2 | 1 | 1 |
| Prime Mover Propulsion Modes of Operation | | | | |
| PMP1 | 1 | 0 | 1 | 0 |
| PMP2 | 1 | 0 | 1 | 1 |
| Prime Mover Idling Modes of Operation | | | | |
| IDLE1 | 1 | 0 | 0 | 0 |
| IDLE2 | 1 | 0 | 0 | 1 |

Fig. 3

POWER SYSTEM

GOVERNMENT RIGHTS

This invention was made with Government support under the terms of Contract No. DE-FC26-04NT42258 awarded by the Department of Energy. The Government may have certain rights in this invention.

TECHNICAL FIELD

The present disclosure relates to power systems and, more particularly, to power systems that include both a prime mover and a motor/generator.

BACKGROUND

Many machines include power systems configured to provide power to perform various tasks, such as propelling the machine. Many power systems include a prime mover configured to produce power by rotating a rotary output member and a transmission having a rotary input member drivingly connected to the rotary output member of the prime mover. Some power systems also include a motor/generator drivingly connected to the rotary output member of the prime mover and/or the rotary input member of the transmission.

Some power systems include a fluid coupler, such as a torque converter, connected between the rotary output member of the prime mover and the rotary input member of the transmission. Such fluid couplers are capable of transmitting power between the rotary output member of the prime mover and the rotary input member of the transmission, while allowing the speeds of the rotary output member of the prime mover and the rotary input member of the transmission to vary substantially independently. Thus, a fluid coupler connected between the rotary output member of a prime mover and the rotary input member of a transmission ensures smooth power transfer between the prime mover and the transmission during steady state operation and also during sudden changes in the operating state of the prime mover and/or the transmission. However, there may be circumstances in which it is desirable to drivingly connect the rotary output member of the prime mover to the rotary input member of the transmission at a fixed speed ratio.

U.S. Pat. No. 6,913,558 to Mori et al. ("the '558 patent") shows a power transmission system having an engine and a motor generator connected to a transmission by a torque converter that has a lockup clutch. In the power transmission system of the '558 patent, the engine and the motor generator are directly connected to one another. The engine and motor generator are connected to one side of the torque converter, and a rotary input member of the transmission is connected to the other side of the torque converter. The torque converter transmits torque via fluid when the lockup clutch is disengaged, and the torque converter drivingly connects the rotary input member of the transmission to the engine and motor generator at a fixed drive ratio when the lockup clutch is engaged. The operating state of the lockup clutch is controlled by a hydraulic control circuit. A "power drive unit" controls the motor generator.

Although the power transmission system of the '558 patent includes a torque converter with a lockup clutch for selectively engaging the rotary input member of the transmission to the engine and motor generator at a fixed speed ratio, certain disadvantages persist. For example, the '558 patent does not disclose any means of coordinating the operation of the motor generator and the lockup clutch. As a result, the power transmission system of the '558 patent may fail to capitalize on opportunities to utilize the motor generator more effectively by controlling the lockup clutch in a manner that complements the operating state of the motor generator. Additionally, because the power transmission system of the '558 patent has the engine and the motor generator connected to the same side of the torque converter, the prime mover and the motor/generator must always operate at the same speed. Thus, the power transmission system of the '558 patent may be unable to capitalize on circumstances in which it may be beneficial to operate the motor generator at a different speed than the engine.

The power system and control methods of the present disclosure solve one or more of the problems set forth above.

SUMMARY OF THE INVENTION

One disclosed embodiment relates to a power system that may include a prime mover, a transmission, and a fluid coupler having a selectively engageable lockup clutch. The fluid coupler may be drivingly connected between the prime mover and the transmission. Additionally, the power system may include a motor/generator drivingly connected to at least one of the prime mover and the transmission. The power system may also include power-system controls configured to execute a control method. The control method may include selecting one of a plurality of modes of operation of the power system. Additionally, the control method may include controlling the operating state of the lockup clutch dependent upon the mode of operation selected. The control method may also include controlling the operating state of the motor/generator dependent upon the mode of operation selected.

Another embodiment relates to a method of operating a power system of a mobile machine. The power system may have a prime mover, a transmission, and a fluid coupler. The fluid coupler may have a selectively engageable lockup clutch and may be drivingly connected between the prime mover and the transmission. The power system may further include a motor/generator drivingly connected to at least one of the prime mover and the transmission. The method of operating the power system of the mobile machine may include receiving one or more inputs relating to conditions of operation of the power system and, dependent upon the one or more inputs relating to conditions of operation of the power system, selecting one of a plurality of modes of operation of the power system. The method of operating the power system of the mobile machine may also include controlling the operating state of the lockup clutch dependent upon which mode of operation has been selected. Additionally, the method of operating the power system of the mobile machine may include controlling the operating state of the motor/generator dependent upon which mode of operation has been selected.

A further disclosed embodiment relates to a mobile machine, which may include a prime mover having a rotary output member and a transmission having rotary input member and a rotary output member. The mobile machine may also include a motor/generator, which may have a rotor drivingly connected to the rotary input member of the transmission. Additionally, the mobile machine may include a fluid coupler, which may have a selectively engageable lockup clutch. The fluid coupler may be connected between the rotor of the motor/generator and the rotary output member of the prime mover. Additionally, the mobile machine may include one or more propulsion devices drivingly connected to the rotary output member of the transmission.

BRIEF DESCRIPTION OF THE DRAWINGS

FIG. 3 is a table listing a plurality of possible modes of operation of a power system according to the present disclosure.

DETAILED DESCRIPTION

Figure 1:
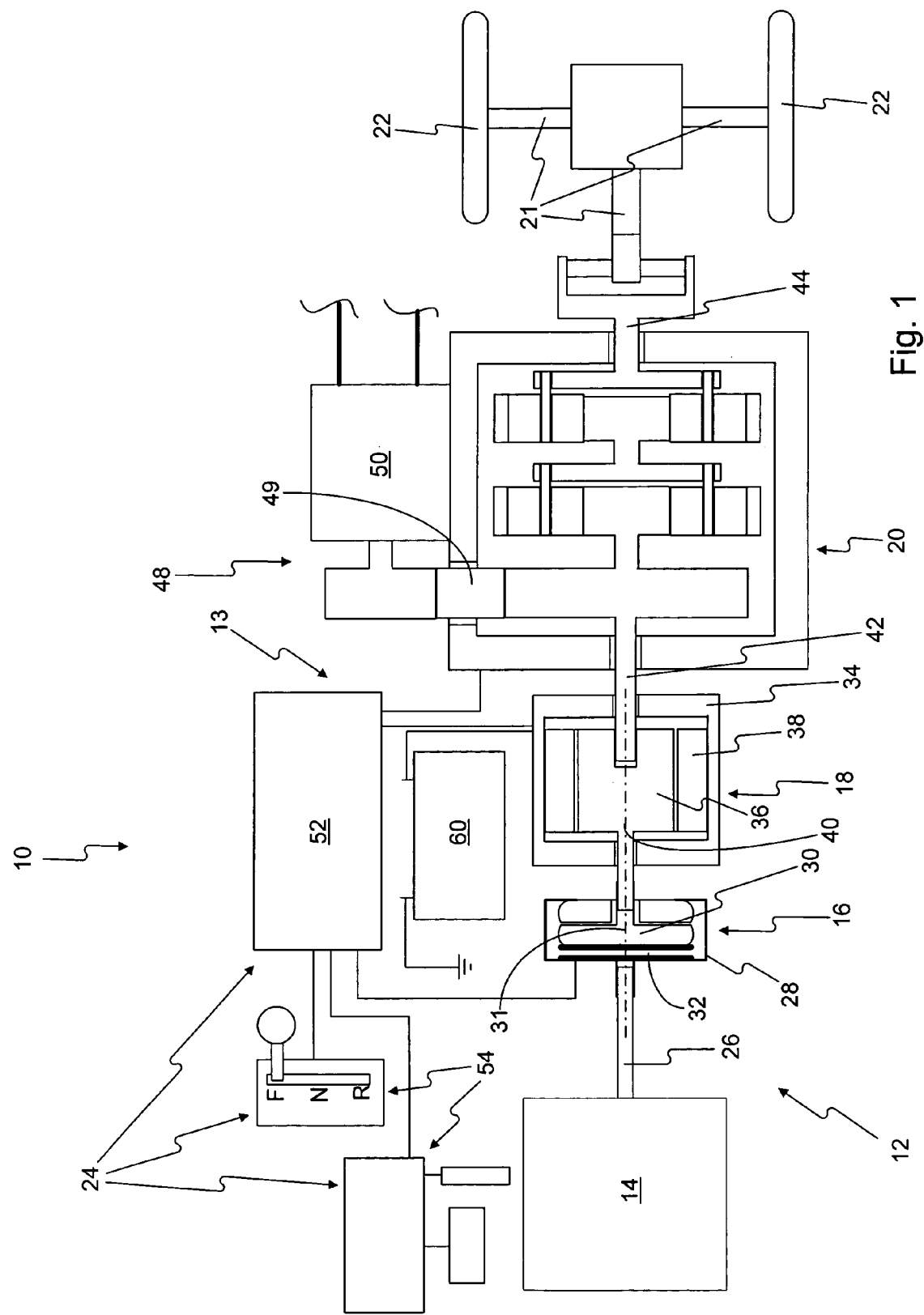
FIG. 1 is a diagrammatic illustration of one embodiment of a mobile machine having a power system according to the present disclosure.

FIG. 1 illustrates one embodiment of a mobile machine 10 according to the present disclosure. Mobile machine 10 may include a power system 12 and an electrical system 13. Power system 12 may be configured to provide power for various tasks of mobile machine 10. For example, power system 12 may be configured to provide power to propel mobile machine 10, power to operate one or more implements (not shown) of mobile machine 10, and/or electrical power for use by electrical system 13. Electrical system 13 may be configured to utilize electricity to perform various tasks of mobile machine 10.

Power system 12 may include a prime mover 14, a fluid coupler 16, a motor/generator 18, a transmission 20, drive shafts 21, propulsion devices 22, and power-system controls 24. Prime mover 14 may be any type of device configured to produce power by rotating a rotary output member 26. For example, prime mover 14 may be a diesel engine, a gasoline engine, a gaseous-fuel-driven engine, a turbine, a hydraulic motor, or an electric motor.

Fluid coupler 16 may include a rotary member 28, a rotary member 30, and a selectively-engageable lockup clutch 32. Fluid coupler 16 may be a torque converter or any other type of coupler configured to utilize fluid to transfer power between rotary members 28, 30. Fluid coupler 16 may be configured such that, when selectively-engageable lockup clutch 32 is disengaged, rotary members 28, 30 may rotate relative to one another about a common rotation axis 31. Additionally, fluid coupler 16 may be configured such that rotating one of rotary members 28, 30 causes that rotary member 28, 30 to drive fluid against the other rotary member 28, 30 and, thereby, create a torque on the other rotary member 28, 30. Furthermore, fluid coupler 16 may be configured such that when selectively-engageable lockup clutch 32 is engaged, selectively-engageable lockup clutch 32 locks rotary members 28, 30 to one another such that rotary members 28, 30 rotate as a unit.

Motor/generator 18 may include a housing 34, a rotor 36, and a stator 38. Housing 34 may support rotor 36 in such a manner that rotor 36 may rotate about a rotor rotation axis 40, which may be coincident with axis 31 in some embodiments. Additionally, housing 34 may support stator 38 in a stationary position adjacent rotor 36.

Motor/generator 18 may be controllable to operate either in a motoring mode or a generating mode. Motor/generator 18 may be operated in a motoring mode by supplying stator 38 with electric current in a manner to create a rotating magnetic field that applies a torque to rotor 36. When a component other than stator 38 rotates rotor 36, motor/generator 18 may be operated in generating mode, wherein a magnetic field created by rotor 36 rotates with rotor 36 and generates electric current in stator 38.

Transmission 20 may include a rotary input member 42 and a rotary output member 44. Transmission 20 may be configured such that it has one or more available power-transmitting operating states wherein rotary input member 42 is drivingly connected to rotary output member 44. In some embodiments, transmission may be configured with multiple available power-transmitting operating states, and different power-transmitting operating states of transmission 20 may provide different drive ratios between rotary input member 42 and rotary output member 44. Furthermore, transmission 20 may be an automatic type transmission configured to provide automatic changes in the drive ratio between rotary input member 42 and rotary output member 44, under control of power-system controls 24. Additionally, transmission 20 may be configured with one or more available non-power-transmitting operating states, wherein rotary input member 42 and rotary output member 44 are not drivingly connected to one another.

Additionally, transmission 20 may include a power-takeoff device 48. Power-takeoff device 48 may be continuously drivingly connected to rotary input member 42, or power-takeoff device 48 may be configured to be selectively drivingly connected to rotary input member 42. Power-takeoff device 48 may connect directly to rotary input member 42, or power-takeoff device may connect to rotary input member 42 through other components, such as an idler gear 49. Power-takeoff device 48 may be configured to receive power from rotary input member 42 and transfer that power to one or more implements (not shown) of mobile machine 10. For example, power-takeoff device 48 may include a pump 50 configured to receive power from rotary input member 42 and pump fluid for use by one or more implements of mobile machine 10.

Prime mover 14, fluid coupler 16, motor/generator 18, and transmission 20 may all be drivingly connected to one another. Fluid coupler 16 may be connected between rotary output member 26 of prime mover 14 and rotary input member 42 of transmission 20, and motor/generator 18 may be drivingly connected to at least one of rotary output member 26 of prime mover 14 and rotary input member 42 of transmission 20. For example, as is shown in FIG. 1, rotary member 28 of fluid coupler 16 may be connected to rotary output member 26 of prime mover 14, and rotor 36 of motor/generator 18 may be connected between rotary member 30 of fluid coupler 16 and rotary input member 42 of transmission 20.

However, the manner in which prime mover 14, fluid coupler 16, motor/generator 18, and transmission 20 are connected to one another is not limited to the configuration shown in FIG. 1. For example, rotor 36 of motor/generator 18 may be connected between rotary output member 26 of prime mover 14 and rotary member 28 of fluid coupler 16. Additionally, rotor 36 of motor/generator 18 may be indirectly connected to rotary output member 26 of prime mover 14 or rotary input member 42 of transmission 20 through one or more power-transfer components such as gears, pulleys, belts, sprockets, and/or chains. Furthermore, rotor 36 may be formed as an integral part of rotary output member 26 of prime mover 14, rotary input member 42 of transmission 20, or one of rotary members 28, 30 of fluid coupler 16.

Propulsion devices 22 may be drivingly connected to rotary output member 44 of transmission 20 by drive shafts 21. Propulsion devices 22 may be configured to receive power from drive shafts 21 and utilize that power to propel mobile machine 10. For example, propulsion devices 22 may include wheels, track units, and/or other types of devices configured to receive power from drive shafts 21 and apply that power to the ground to propel mobile machine 10. Additionally, one or more of propulsion devices 22 may include propellers and/or other types of devices configured to receive power from drive shafts 21 and transmit that power to air or water, to propel mobile machine 10.

Power-system controls 24 may include a controller 52, operator controls 54, various sensors (not shown), one or more actuators (not shown), and various other control components (not shown). Controller 52 may include one or more processing devices (not shown) and one or more memory devices (not shown). Controller 52 may be communicatively linked to operator controls 54, so that operator controls 54 may transmit signals relating to operator inputs to controller 52. Additionally, controller 52 may be communicatively linked to various sensors (not shown), which may provide various inputs relating to the operation of various components of mobile machine 10, including components of power system 12 and components of electrical system 13. Furthermore, power-system controls 24 may be configured such that controller 52 may exercise control over the operating states of prime mover 14, motor/generator 18, transmission 20, selectively-engageable lockup clutch 32, and power-takeoff device 48.

Power-system controls 24 are not limited to the configuration illustrated in FIG. 1. For example, in addition to, or in place of controller 52, power-system controls 24 may include other types of logic systems such as hardwired electrical logic circuits, hydraulic logic systems, and/or pneumatic logic systems. Additionally, power-system controls 24 may include other controllers in addition to, or in place of, controller 52. Such other controllers may operate in conjunction with controller 52 to control one or more components of power system 12, or such other controllers may control one or more components of power system 12 without input from controller 52.

Electrical system 13 may include motor/generator 18, controller 52, various sensors (not shown) of power-system controls 24, various components of operator controls 54, and an electrical storage device 60, such as a battery. As is shown in FIG. 1, electrical storage device 60 may be connected to motor/generator 18. Accordingly, electrical storage device 60 may receive some or all of the electricity generated by motor/generator 18 when it generates electricity, and electrical storage device 60 may provide some or all of the electricity utilized by motor/generator 18 when motor/generator 18 motors.

INDUSTRIAL APPLICABILITY

Figure 2:
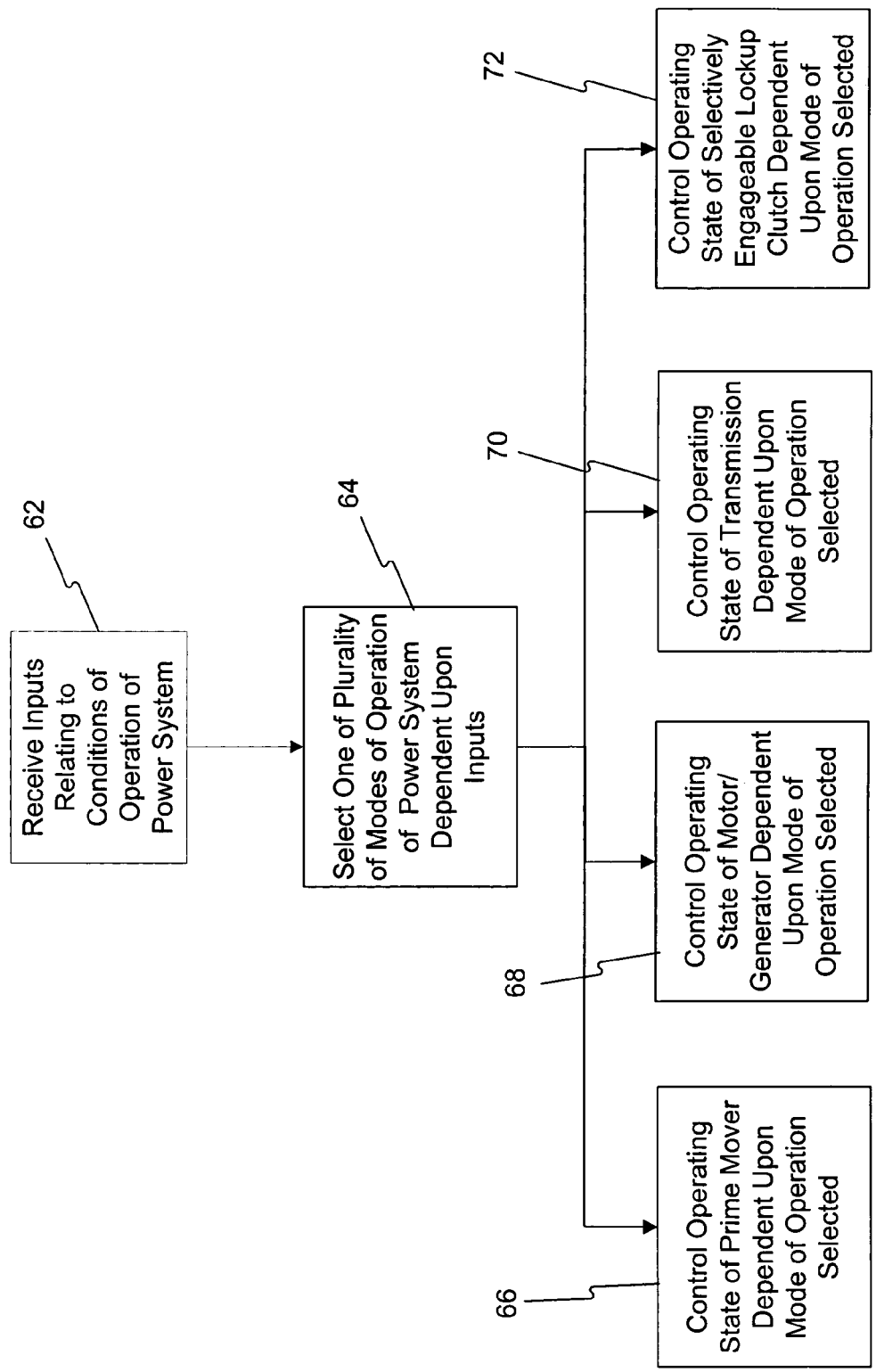
FIG. 2 is a schematic block diagram illustrating one embodiment of a method for controlling a power system.

FIG. 2 illustrates one method that power-system controls 24 may implement to control the operation of power system 12. Controller 52 may receive inputs related to conditions of operation of power system 12 (step 62). For example, controller 52 may receive inputs from operator controls 54, inputs from one or more sensors (not shown) relating to the operating state of one or more components or systems of mobile machine 10, and/or inputs from other controllers (not shown) of mobile machine 10. Dependent upon the inputs controller 52 has received, controller 52 may then select one of a plurality of possible modes of operation of power system 12 (step 64). For example, controller 52 may select one of the modes of operation discussed below in connection with FIG. 3.

After selecting a mode of operation, controller 52 may control the operating states of one or more of prime mover 14, motor/generator 18, selectively-engageable lockup clutch 32, and transmission 20 dependent upon the mode of operation selected (steps 66, 68, 70, and 72). In order to do so, controller 52 may reference one or more databases that include data on the preferred operating states of prime mover 14, motor/generator 18, selectively-engageable lockup clutch 32, and transmission 20 for each mode of operation. For example, controller 52 may reference a database that contains data corresponding to the information contained in FIG. 3.

FIG. 3 is a table showing operating states of motor/generator 18, prime mover 14, selectively-engageable lockup clutch 32, and transmission 20 for a number of possible modes of operation of power system 12. For purposes of this disclosure, each mode of operation has been named and grouped according to one function provided by the mode of operation. Many of the modes of operation provide other functions, in addition to the functions indicated by their names.

The possible modes of operation illustrated by FIG. 3 include electric-propulsion modes of operation PEPF, PEPR, HEP1, and HEP2. In each of these modes, motor/generator 18 may motor to drive rotary input member 42 of transmission 20 and transmission 20 may have a power-transmitting operating state, such that motor/generator 18 provides power to propulsion devices 22 through transmission 20. Modes PEPF and PEPR may be pure electric-propulsion modes of operation, wherein prime mover 14 is inactive. In modes PEPF and PEPR, selectively-engageable lockup clutch 32 may be disengaged to allow rotary member 30 of fluid coupler 16 to rotate with rotor 36 of motor/generator 18, while rotary member 28 of fluid coupler 16 remains stationary with rotary output member 26 of prime mover 14. In mode PEPF, motor/generator may motor in a forward direction, to propel mobile machine 10 forward, whereas, in mode PEPR, motor/generator 18 may motor in a reverse direction, to propel mobile machine 10 rearward. Modes HEP1 and HEP2 may be hybrid electric-propulsion modes of operation, wherein prime mover 14 also provides power to rotary input member 42 of transmission 20. In HEP1, selectively-engageable lockup clutch 32 may be disengaged, whereas, in HEP2, selectively-engageable lockup clutch 32 may be engaged.

Modes of operation G1-G5 may be electricity-generating modes of operation, wherein motor/generator 18 generates electricity. In each of modes G1-G4, prime mover 14 may drive fluid coupler 16, which may, in turn drive rotor 36 of motor/generator 18. Modes G1-G4 may differ from one another in that they have different combinations of operating states of transmission 20 and selectively-engageable lockup clutch 32. Mode G5 may be a mode of operation for generating electricity when prime mover 14 is inactive and mobile machine 10 is in motion. In mode G5, transmission 20 may have a power-transmitting operating state while mobile machine 10 is in motion, such that momentum of mobile machine 10 drives propulsion devices 22, which transmit power to rotor 36 of motor/generator 18 through drive shafts 21 and transmission 20.

Modes STARTPM1-STARTPM4 may be prime-mover-starting modes of operation for driving prime mover 14 when it is not operating under its own power, to allow prime mover 14 to commence operating under its own power. In each of modes STARTPM1-STARTPM4, rotor 36 of motor/generator 18 may transmit power through fluid coupler 16 to rotary output member 26 of prime mover 14. Additionally, in each of these modes, selectively-engageable lockup clutch 32 may be engaged, so that rotary member 28 will drive rotary output member 26 of prime mover 14 at the same speed as rotor 36 drives rotary member 30. In modes STARTPM1 and STARTPM2, the power to drive prime mover 14 may be provided by motoring motor/generator 18. In modes STARTPM3 and STARTPM4, the power to drive prime mover 14 may be drawn from momentum of mobile machine 10. In order to accomplish this, modes STARTPM3 and STARTPM4 may include causing transmission 20 to have a power-transmitting operating state while mobile machine 10 is in motion. Additionally, in mode STARTPM3, motor/generator 18 may be inactive, whereas in mode STARTPM4, motor/generator 18 may utilize power from the momentum of mobile machine 10 to generate electricity.

Modes PTO1-PTO3 may be electric power-takeoff modes of operation for driving power-takeoff device 48 at least partially with power from motor/generator 18. In each of modes PTO1-PTO3, motor/generator 18 may motor to drive rotary input member 42 of transmission 20, while power-takeoff device 48 is drivingly connected to rotary input member 42. In modes PTO2 and PTO3, prime mover 14 may also provide power to rotary input member 42 of transmission 20. In mode PTO2, selectively-engageable lockup clutch 32 may be disengaged, whereas in mode PTO3, selectively-engageable lockup clutch 32 may be engaged.

Modes R1 and R2 may be retarder modes of operation for decelerating mobile machine 10. Each of modes R1 and R2 may include causing transmission 20 to have a power-transmitting operating state when mobile machine 10 is in motion, such that rotary input member 42 of transmission 20 rotates rotor 36 of motor/generator 18. Additionally, each of modes R1 and R2 may include causing motor/generator 18 to motor in a direction opposite the direction in which rotary input member 42 is rotating rotor 36. In other words, electric current is supplied to stator 38 in such a manner that stator 38 creates a rotating magnetic field that applies a torque on rotor 36 in a direction opposite the direction in which rotor 36 is rotating. In mode R1, selectively-engageable lockup clutch 32 may be disengaged, whereas, in mode R2, selectively-engageable lockup clutch 32 may be engaged.

Modes PMP1 and PMP2 may be modes of operation for propelling mobile machine 10 with power from prime mover 14 only. In each of modes PMP1 and PMP2, prime mover 14 provides power to rotary input member 42 of transmission 20, and transmission 20 has a power-transmitting operating state, such that transmission 20 transmits power from prime mover 14 to propulsion devices 22. Additionally, in each of modes PMP1 and PMP2, motor/generator 18 may be inactive. In mode PMP1, selectively-engageable lockup clutch 32 may be disengaged, whereas, in mode PMP2, selectively-engageable lockup clutch 32 may be engaged.

Modes IDLE1 and IDLE2 may be modes in which prime mover 14 is operating, but power system 12 does not utilize power from prime mover 14 to propel mobile machine 10, to operate power-takeoff device 48, or to generate electricity with motor/generator 18. In each of modes IDLE1 and IDLE2, transmission 20 may have a non-power-transmitting operating state and motor/generator 18 may be inactive. In mode IDLE1, selectively-engageable lockup clutch 32 may be disengaged, whereas, in mode IDLE2, selectively-engageable lockup clutch 32 may be engaged.

Methods of controlling power system 12 are not limited to the embodiments discussed above in connection with FIGS. 2 and 3. For example, power-system controls 24 may automatically control only a subset of the components of the power system 12 dependent upon the mode of operation selected. In some embodiments, an operator may manually control one or more components of power system 12, and power-system controls 24 may select a mode of operation dependent upon the operating states of the components manually controlled by the operator. Additionally, rather than a single controller 52 controlling all of the components of power system 12, multiple controllers may control the components of power system 12 according to the disclosed methods. Furthermore, a method of controlling power system 12 may omit one or more of the disclosed modes of operation and/or include modes of operation not disclosed.

Power system 12 may have application in any type of machine that requires power to perform one or more tasks. The disclosed embodiments may provide flexible, coordinated operation of power system 12. Connecting fluid coupler 16 between motor/generator 18 and prime mover 14 may allow motor/generator 18 to operate at a different speed than prime mover 14. This may enable many of the modes of operation discussed above in connection with FIG. 3, such as modes of operation wherein motor/generator 18 is operating and prime mover 14 is inactive. Additionally, selecting a mode of operation for power system 12 and controlling the operating states of two or more of motor/generator 18, selectively-engageable lockup clutch 32, transmission 20, and prime mover 14 dependent upon the selected mode of operation may ensure coordinated operation of these components. This may contribute to the effectiveness of power system 12.

It will be apparent to those skilled in the art that various modifications and variations can be made in the disclosed power system and control methods without departing from the scope of the disclosure. Other embodiments of the disclosed power system and control methods will be apparent to those skilled in the art from consideration of the specification and practice of the power system and control method disclosed herein. It is intended that the specification and examples be considered as exemplary only, with a true scope of the disclosure being indicated by the following claims and their equivalents.

What is claimed is:

1. A power system of a mobile machine, including:
   a prime mover;
   a transmission;
   a fluid coupler having a selectively-engageable lockup clutch, the fluid coupler being drivingly connected between the prime mover and the transmission;
   a motor/generator drivingly connected to at least one of the prime mover and the transmission;
   power-system controls configured to execute a control method, the control method including
      selecting one of a plurality of modes of operation of the power system;
      controlling the operating state of the lockup clutch dependent upon the mode of operation selected;
      controlling the operating state of the motor/generator dependent upon the mode of operation selected;
      wherein controlling the operating state of the lockup clutch dependent upon the mode of operation selected includes referencing a database that includes data relating to the preferred operating state of the lockup clutch for each mode of operation of the power system; and
      wherein controlling the operating state of the motor/generator dependent upon the mode of operation selected includes referencing a database that includes data relating to the preferred operating state of the motor/generator for each mode of operation of the power system.

2. The power system of claim 1, wherein referencing a database that includes data relating to the preferred operating state of the lockup clutch for each mode of operation of the power system and referencing a database that includes data relating to the preferred operating state of the motor/generator for each mode of operation of the power system include referencing one database that includes data relating to the preferred operating states of the lockup clutch and the motor/generator for each mode of operation of the power system.

3. The power system of claim 1, wherein the control method further includes controlling the operating state of the transmission dependent upon the mode of operation selected.

4. The power system of claim 1, wherein:
the motor/generator is drivingly connected to a rotary input member of the transmission;
the fluid coupler is drivingly connected between the motor/generator and the prime mover;
one of the plurality of modes of operation is a prime-mover-starting mode of operation; and
when the prime-mover-starting mode of operation is selected
controlling the operating state of the selectively engageable lockup clutch includes causing the lockup clutch to be engaged, and
controlling the operating state of the motor/generator includes causing the motor/generator to motor.

5. The power system of claim 4, wherein:
one of the plurality of modes of operation is an electric-propulsion mode of operation;
when the electric-propulsion mode of operation is selected, controlling the operating state of the motor/generator includes causing the motor/generator to motor; and
the control method further includes causing the transmission to have a power-transmitting operating state when the electric-propulsion mode of operation is selected.

6. The power system of claim 5, wherein:
one of the plurality of modes of operation is an electricity-generating mode of operation; and
when the electricity-generating mode of operation is selected, controlling the operating state of the motor/generator includes causing the motor/generator to generate electricity.

7. The power system of claim 5, wherein:
the transmission further includes a power-takeoff device that is continuously or may be selectively drivingly connected to a rotary input member of the transmission;
one of the plurality of modes of operation is an electric power-takeoff mode of operation for driving the power-takeoff device at least partially with power from the motor/generator when the power-takeoff device is drivingly connected to the rotary input member of the transmission; and
when the electric power-takeoff mode of operation is selected, controlling the operating mode of the motor/generator includes causing the motor/generator to motor.

8. The power system of claim 7, wherein the control method further includes causing the transmission to have a non-power-transmitting operating state when the electric power-takeoff mode of operation is selected.

9. The power system of claim 1, wherein at least one of the plurality of available operating modes includes simultaneously operating the motor/generator to provide power to propel the mobile machine and operating the prime mover to provide power to propel the mobile machine.

10. A method of operating a power system of a mobile machine, the power system having a prime mover, a transmission, a fluid coupler having a selectively-engageable lockup clutch and being drivingly connected between the prime mover and the transmission, and a motor/generator drivingly connected to at least one of the prime mover and the transmission, the method of operating the power system of the mobile machine including:
receiving one or more inputs relating to conditions of operation of the power system;
dependent upon the one or more inputs relating to conditions of operation of the power system, selecting one of a plurality of modes of operation of the power system;
controlling the operating state of the lockup clutch dependent upon which mode of operation has been selected;
controlling the operating state of the motor/generator dependent upon which mode of operation has been selected; and
controlling the operating state of the prime mover dependent upon the mode of operation selected.

11. The method of claim 10, wherein:
the motor/generator is drivingly connected to a rotary input member of the transmission;
the fluid coupler is drivingly connected between the motor/generator and the prime mover;
one of the plurality of modes of operation of the power system is a prime-mover-starting mode of operation for driving the prime mover when it is not operating under its own power; and
when the prime-mover-starting mode of operation is selected
controlling the operating state of the lockup clutch includes causing the lockup clutch to be engaged, and
controlling the operating state of the motor/generator includes causing the motor/generator to motor.

12. The method of claim 11, wherein:
one of the plurality of modes of operation is an electric-propulsion mode of operation for propelling the mobile machine at least partially with power from the motor/generator;
when the electric-propulsion mode of operation is selected, controlling the operating state of the motor/generator includes causing the motor/generator to motor; and
the control method further includes causing the transmission to have a power-transmitting operating state when the electric-propulsion mode of operation is selected.

13. The method of claim 12, wherein:
one of the plurality of modes of operation is an electricity-generating mode of operation; and
when the electricity generation mode of operation is selected, controlling the operating state of the motor/generator includes causing the motor/generator to generate electricity.

14. The method of claim 10, wherein:
the motor/generator is drivingly connected to a rotary input member of the transmission;
one of the plurality of modes of operation is a retarder mode of operation for decelerating the mobile machine;
the control method further includes controlling the operating state of the transmission dependent upon the mode of operation selected, including causing the transmission to have a power-transmitting operating state when the retarder mode of operation has been selected; and when the retarder mode of operation has been selected, controlling the operating state of the motor/generator includes causing the motor/generator to motor in a direction opposite a direction in which the rotary input member of the transmission is driving the motor/generator.

15. The method of claim 10, wherein:
the transmission includes a rotary input member and a power-takeoff device that is drivingly connected to the rotary input member of the transmission;
one of the plurality of modes of operation is an electric power-takeoff mode of operation for driving the power-takeoff device at least partially with power from the motor/generator;
the control method further includes causing the transmission to have a non-power-transmitting operating state when the electric power-takeoff mode of operation is selected; and
when the electric power-takeoff mode of operation is selected, controlling the operating state of the motor/generator includes causing the motor/generator to motor.

16. The method of claim 10, wherein:
controlling the operating state of the lockup clutch dependent upon the mode of operation selected includes referencing a database that includes data relating to the preferred operating state of the lockup clutch for each mode of operation; and
controlling the operating state of the motor/generator dependent upon the mode of operation selected includes referencing a database that includes data relating to the preferred operating state of the motor/generator for each mode of operation of the power system.

17. The method of claim 10, wherein:
controlling the operating state of the lockup clutch and controlling the operating state of the motor/generator include referencing a database that includes data relating to the preferred operating states of the lockup clutch and the motor/generator for each mode of operation of the power system.

18. The method of claim 10, further including controlling the operating state of the transmission dependent upon the mode of operation selected.

19. The method of claim 18, further including controlling the operating state of the prime mover dependent upon the mode of operation selected.

20. A mobile machine, including:
a prime mover having a rotary output member;
a transmission having a rotary input member and a rotary output member;
a motor/generator having a rotor drivingly connected to the rotary input member of the transmission;
a fluid coupler having a selectively engageable lockup clutch, the fluid coupler being connected between the rotor of the motor/generator and the rotary output member of the prime mover; and
one or more propulsion devices drivingly connected to the rotary output member of the transmission.

21. The mobile machine of claim 20, further including:
power-system controls configured to execute a control method, the control method including
when the prime mover is not operating under its own power, selectively operating the power system in a prime-mover-starting mode, wherein the lockup clutch is engaged and the motor/generator motors to drive the prime mover.

22. The mobile machine of claim 21, wherein:
the prime-mover-starting mode is a first prime-mover-starting mode;
the control method further includes selectively operating the power system in a second prime-mover-starting mode, wherein the prime mover is not operating under its own power, the mobile machine is in motion, the transmission has a power-transmitting operating state, and the lockup clutch is engaged, such that momentum of the mobile machine drives the prime mover.

23. The mobile machine of claim 21, wherein the control method further includes selectively operating the power system in an electric-propulsion mode, wherein the transmission has a power-transmitting operating state and the motor/generator motors to drive the rotary input member of the transmission.

24. The mobile machine of claim 23, wherein the electric-propulsion mode is a pure electric-propulsion mode wherein the prime mover is inactive and the lockup clutch is disengaged.

25. The mobile machine of claim 23, wherein the electric-propulsion mode is a hybrid electric-propulsion mode wherein the prime mover assists the motor/generator in driving the rotary input member of the transmission.

26. The mobile machine of claim 23, wherein the control method further includes selectively operating the power system in an electricity-generating mode wherein the motor/generator generates electricity.

27. The mobile machine of claim 26, wherein the electricity-generating mode further includes the prime mover providing power to the rotor of the motor/generator through the fluid coupler.

28. The mobile machine of claim 26, wherein the electricity-generating mode further includes the transmission having a power-transmitting operating state while the mobile machine is in motion, such that momentum of the mobile machine drives the rotor of the motor/generator.

29. The mobile machine of claim 20, wherein:
the transmission further includes a power-takeoff device; and
the power system further includes power-system controls configured to selectively operate the power system in an electric power-takeoff mode, wherein the motor/generator drives the rotary input member of the transmission while the power-takeoff device is drivingly connected to the rotary input member of the transmission.

30. The mobile machine of claim 20, further including power-system controls configured to selectively operate the power system in a retarder mode, wherein the transmission has a power-transmitting operating state while the mobile machine is in motion and the motor/generator motors in a direction opposite which the rotary input member of the transmission is driving the rotor of the motor/generator.

31. The mobile machine of claim 20, further including a controller that controls the operating states of both the motor/generator and the lockup clutch.

32. The mobile machine of claim 31, wherein the controller also controls the operating state of the transmission.

33. The mobile machine of claim 31, wherein the controller controls the operating state of the motor/generator and the operating state of the lockup clutch by selecting a mode of operation of the power system and referencing a database that includes data relating to the preferred operating state of the motor/generator and the lockup clutch for each mode of operation of the power system.

* * * * *